United States Patent
Dalsgaard et al.

(10) Patent No.: US 8,116,736 B2
(45) Date of Patent: Feb. 14, 2012

(54) FORBIDDEN TRACKING AREA OPTIMIZATION FOR PRIVATE/HOME NETWORKS

(75) Inventors: Lars Dalsgaard, Oulu (FI); Jarkko T. Koskela, Oulu (FI); Ivan Ore, Nummela (FI); Kari Sipila, Vantaa (FI)

(73) Assignee: Nokia Corporation, Espoo (FI)

( * ) Notice: Subject to any disclaimer, the term of this patent is extended or adjusted under 35 U.S.C. 154(b) by 1022 days.

(21) Appl. No.: 12/069,240

(22) Filed: Feb. 8, 2008

(65) Prior Publication Data

US 2008/0194235 A1 Aug. 14, 2008

Related U.S. Application Data

(60) Provisional application No. 60/900,656, filed on Feb. 9, 2007.

(51) Int. Cl.
*H04M 1/66* (2006.01)
(52) U.S. Cl. ............ 455/411; 455/435.2; 455/437; 455/432.1
(58) Field of Classification Search ............ 455/410, 455/411, 435.2, 432.1, 436–444, 464, 525
See application file for complete search history.

(56) References Cited

U.S. PATENT DOCUMENTS

| | | | | |
|---|---|---|---|---|
| 5,664,134 A * | 9/1997 | Gallup et al. | | 712/245 |
| 2003/0040314 A1* | 2/2003 | Hogan et al. | | 455/435 |
| 2004/0236849 A1 | 11/2004 | Cooper et al. | | 709/224 |
| 2005/0090277 A1* | 4/2005 | Islam et al. | | 455/525 |
| 2006/0040661 A1 | 2/2006 | Choi et al. | | 455/432.3 |
| 2006/0084443 A1* | 4/2006 | Yeo et al. | | 455/449 |

FOREIGN PATENT DOCUMENTS

| | | |
|---|---|---|
| DE | 10308012 A1 | 9/2004 |
| EP | 1286561 A1 | 2/2003 |
| GB | 2411317 A | 8/2005 |
| GB | 2415855 A | 1/2006 |

OTHER PUBLICATIONS

3GPP TSG-RAN WG2#60, R2-074648, "MBMS Session Start and UE Mobility between MBSFN and PTM", Motorola, Nov. 5-9, 2007, Jeju, Korea, 3 pgs.

* cited by examiner

*Primary Examiner* — Jean Gelin
*Assistant Examiner* — Michael Nguyen
(74) *Attorney, Agent, or Firm* — Harrington & Smith (57) ABSTRACT

Access verification is adaptively done using an identifier of a first or a second length, by comparing a field of a node address that has the determined first or second length against a locally stored access list. At least the compared field of the node address is either added to a locally stored list of cell selection candidate nodes where the access list is allowed identifiers, or excluded from it where the access list is restricted identifiers. The node identifier is in three sections. The first section is service type, which the UE can use to determine whether or not it is restricted/allowed. The first length is the length of the second section, which is a service area ID of a group of network nodes. The second length is the length of the second section plus the third section, which identifies one node of the group of network nodes.

22 Claims, 6 Drawing Sheets

SCENARIO 1
SUB-NETWORKS IN
DIFFERENT FREQUENCY BANDS
USING SAME RAT

FIG.5

SCENARIO 2
SUB-NETWORKS IN THE SAME FREQUENCY BAND USING SAME RAT

FIG.6

SCENARIO 3
SUB-NETWORKS IN USING DIFFERENT RAT

FORBIDDEN TRACKING AREA OPTIMIZATION FOR PRIVATE/HOME NETWORKS

CROSS REFERENCE TO RELATED APPLICATION

This application claims priority under 35 USC 119(e) to U.S. Provisional Patent Application No. 60/900,656, filed on Feb. 9, 2007. It is also related to PCT/IB2007/004139, filed Dec. 28, 2007 and to its priority U.S. provisional application filed Dec. 29, 2007. The contents of those three applications are hereby incorporated by reference in their entirety.

TECHNICAL FIELD

This invention relates to wireless communication networks having nodes that restrict access to certain user equipment. In particular, this invention relates to efficient operation of user equipment and control signaling to track and identify such nodes that restrict access to each particular user equipment.

BACKGROUND

Following are some acronyms used in this description:
LTE long term evolution
UTRAN UMTS terrestrial radio access network (3G)
E-UTRAN evolved UTRAN (3.9G or LTE)
UE user equipment
LA location area
TA tracking area (similar to LA)
LAU LA update
TAU TA update
eNB evolved NodeB (base station or access node of LTE)
BCH broadcast channel
GSM global system for mobile communications
CDMA code division multiple access
PLMN public land mobile network
WLAN wireless local area network
GERAN GSM EDGE radio access network Mobile user equipment transits through various geographic areas and in the process moves from control of one network cell to another to maintain its wireless link with a core network through which data and calls are routed to and from other entities. Generally, the UE will check for neighboring cells at certain specified times when the host cell knows not to page the UE (e.g., idle mode), request a handover to a particular neighbor cell when the UE deems it appropriate, and execute handover procedures as directed by the network. Even where different network operators controlled the different cells, generally in traditional systems any neighbor cell that gave an acceptable signal to the UE was considered a candidate for a handover. Exceptions existed and still exist when a particular cell was incompatible, from a technology standpoint (e.g., GSM versus CDMA) with the UE's capabilities, but since the UE was incompatible with the protocol used by those other cells, the UE never considered them as candidates for a handover.

Several network layers/networks/technologies may co-exist in the same coverage area. Some subscribers/user equipment may have access rights to several of these in a same geographical position. Network operators seek to cover new market segments, and 3G mobility procedures favor large cell sizes (e.g. large as compared to WLAN). In current cellular systems the mobility management is mostly coverage based, even with hierarchical cell structures. Generally, seamless mobility for the UEs is enabled by neighbor cell information provided by the serving cell. Several network operators have expressed an interest in creating wireless network layers with restricted access, e.g. company networks, home basestations etc. A recent technical report (TR R3.018 V0.1.0 (2006-01)) from the radio access network working group WG RAN3 assigns the subscription information handling functionality in the eNodeB, following the trend to translate traditional core network functions into the radio network. As these private networks become more common, a problem arises in that any particular UE must distinguish between those cells to which it can be handed over and those cells to which its access is restricted.

Under the coverage-based approach of traditional idle mode, the operators cannot control the accessibility of the UE subscriber to parts of their network in an efficient way due to other reasons, e.g., based on subscription class. Subscription based mobility control could be handled in theory at the core network (e.g., via Location Areas LA), but this approach causes unnecessary signaling and results in higher network maintenance. Roaming is not an efficient option for this because roaming is based on PLMN codes, which have only a few bits and is seen to exhibit difficulty in implementation (e.g. roaming contracts).

WLAN systems are not seen to use neighbor cell information, one just installs the access point and sets the carrier frequency. With small cell sizes (Pico cells, Femto cells) the construction of the neighbor cell relationships is a tedious task. Even if the neighbor cells would be known, in 3G the maximum number of inter-frequency neighbors is 32. If mobility between a macro cell and more than 32 other cells is desired, say Femto cells, merely extending the prior art 3G mobility concepts tend to indicate that aggressive scrambling code reuse would need to be employed.

In the E-UTRAN one of the requirements is to support e.g. home eNB's. This highlights a problem also relevant in legacy systems (GSM and UTRAN) concerning efficiently restricting some UE's access to certain cells using a minimum amount of signaling while still providing efficient functionality both from the UE and the network point of view. In LTE an identified problem has been how the UE is supposed to identify which cells allow access by the UE and which cells do not, e.g. private network/home base stations may restrict access to certain UEs only. Another problem is how to ensure that UEs with no access permission to one or more particular cells will not consider these cells as viable candidates for cell selection/reselection by that UE.

There have been considerations to use a forbidden location area concept for these purposes. A problem arises when there are large numbers (e.g., hundreds) of private networks and the UE tries to access each of those private networks before it receives an indication that the particular TA is forbidden (either through reading of TA code or TA update). Using the approach that the UE must first attempt access to each network/cell prior to placing that network/cell in its forbidden list poses several problems to both the network and the UE. Specifically:

Signaling is needed and increased for each private network or Home-eNB.
UE power consumption due to this signaling is increased.
The time when the UE is not reachable for paging might increase.
UE memory consumption: as time passes the number of forbidden TAs may rise to a significant number. UE would either need to remember the whole list of TA's which are forbidden or alternatively the UE may have to restrict the list to a maximum number (which then may increase signaling further).

Legacy systems such as interworking scenarios between 2G and 3G wireless systems attempt to handle these types of access restrictions by the use of location area, location update procedure and even the use of specific causes for location update rejections.

The inventors have disclosed one approach for generating and using forbidden neighbor lists for distinguishing allowed from restricted cells in PCT/IB2007/004139, referenced above. That disclosure is seen as most advantageous for environments where the amount of cells under consideration is not large. However, further adaptation is preferable to handle a large amount of private cells (e.g. Home-eNB's) without significantly expanding the signaling required so that a UE can distinguish between allowed and restricted cells.

A particular cell or network may be allowed or restricted for any of various reasons. Most applicable to these teachings is the case where the cell restricting access by a particular UE is fully operational, but does not allow access to that UE, such as private networks and home eNBs. It is in those environments where the number of cells that restrict the UE's access are most likely to accumulate to a larger number, though the teachings herein are not limited by any particular reason a cell is deemed as restricted or allowed for a particular UE. Certain cells restricting UE access may be due to temporary measures imposed by the network such as maintenance, and any cell may be identified to the UE in the same manner, according to the specific teachings below, to indicate whether it is allowed or restricted for the UE.

SUMMARY

According to an embodiment of the invention is a method that includes determining that access verification is to be done using an identifier of a first length or an identifier of a second length, receiving a node address, and performing access verification by comparing a field of the received node address that has the determined first or second length against a locally stored access list. At least the compared field of the node address is added to a locally stored list of cell selection candidate nodes for the case where the access list comprises a list of allowed identifiers, or the compared field of the node address is excluded from the locally stored list of cell selection candidate nodes for the case where the access list comprises a list of restricted identifiers.

According to another embodiment of the invention is an apparatus that includes a processor and a receiver and a local memory. The receiver is configured to receive a node address. The processor is configured to determine that access verification is to be done using an identifier of a first length or an identifier of a second length, and configured to perform access verification by comparing a field of the received node address that has the determined first or second length against a locally stored access list. At least the compared field of the node address is added to a list in the local memory of cell selection candidate nodes for the case where the access list comprises a list of allowed identifiers, or the compared field of the node address is excluded from the list in the memory of cell selection candidate nodes for the case where the access list comprises a list of restricted identifiers.

According to another embodiment of the invention is a computer readable memory embodying a program of machine-readable instructions executable by a digital data processor to perform actions directed toward performing access verification. In this embodiment the actions include determining that access verification is to be done using an identifier of a first length or an identifier of a second length, receiving a node address, and performing access verification for comparing a field of the received node address that has the determined first or second length against a locally stored access list. The actions further include adding at least the compared field of the node address to a locally stored list of cell selection candidate nodes for the case where the access list comprises a list of allowed identifiers, or excluding the compared field of the node address from the locally stored list of cell selection candidate nodes for the case where the access list comprises a list of restricted identifiers.

According to another embodiment of the invention is an apparatus that includes receiving means and processing means and memory means. The receiving means is for receiving a node address. The processing means is for determining that access verification is to be done using an identifier of a first length or an identifier of a second length, and for performing access verification by comparing a field of the received node address that has the determined first or second length against a locally stored access list. And the memory means is for adding at least the compared field of the node address to a list of cell selection candidate nodes for the case where the access list comprises a list of allowed identifiers, or for excluding the compared field of the node address from the list of cell selection candidate nodes for the case where the access list comprises a list of restricted identifiers. In a particular embodiment, the receiving means is a receiver, the processing means is a digital processor, and the memory means is a local memory.

According to yet another embodiment of the invention is a method that includes determining whether a first length identifier or a second length identifier is to be used for access verification by user equipments, and sending an indication that access verification is to be done using an identifier of the first length or an identifier of the second length, and sending a node address for access verification.

According to still another embodiment of the invention is an apparatus that includes a transmitter and a processor. The processor configured to determine whether a first length identifier or a second length identifier is to be used for access verification by user equipments. The transmitter is configured to send an indication that access verification is to be done using an identifier of the first length or an identifier of the second length, and configured to send a node address for the access verification.

These and other aspects are detailed further below with particularity.

BRIEF DESCRIPTION OF THE DRAWINGS

The following detailed description is most clearly understood with reference to the following drawing figures.

DETAILED DESCRIPTION

This invention relates to wireless nodes that restrict access to certain UEs (similar to the forbidden location area concept used in UTRAN/GERAN, but this invention is not restricted only to UTRAN/GERAN) or cell access restrictions and how to handle the problem of having many small cells or cell clusters which may have restricted access permissions for certain UE's. In general, embodiments of this invention use a tiered concept of service area identifiers (similar to location area LA or tracking area TA identifiers). Service area identifiers are in two parts, a common part identifying the service area itself, and a cell identification ID part that identifies a particular cell within the service area. The use of the term service area is generic, and not to be construed as limited only to the LA and TA terms specifically defined in various wireless protocols such as UTRAN.

Further respecting the terminology used herein, "idle mode" refers to the cases where there is no user plane data transferred between the network and the UE. i.e. the 3G CELL_PCH, URA_PCH and CELL_FACH like states belong to "Idle mode" (PCH=paging channel; FACH=forward access channel). However, embodiments of this invention are not limited to the idle mode of a UE. "Cell selection" is meant to include both cell selection and cell reselection, which in 3G refer to distinctly different concepts. A sub network is a part of an operator's network assigned to a specific service and/or logical and/or geographical domain. One sub network may also be operated by a third party having a contract with the operator owning the frequency licence. One subscription may have access rights to many sub networks.

Figure 1:
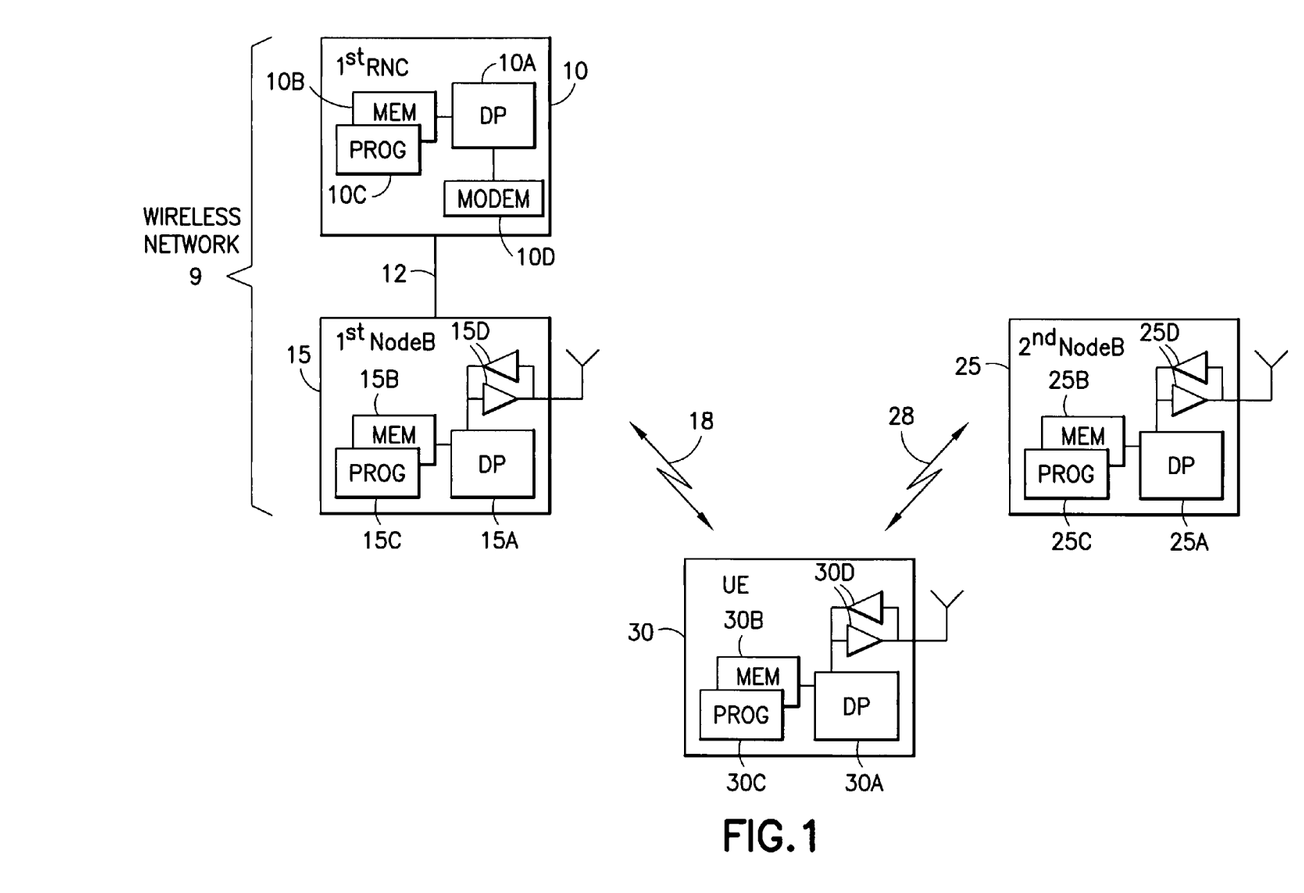
FIG. 1 is a schematic block diagram of various devices that may be used to practice the various aspects of the invention.

Prior to detailing particular embodiments, reference is made first to FIG. 1 for illustrating a simplified block diagram of various electronic devices that are suitable for use in practicing the exemplary embodiments of this invention. In FIG. 1 a first wireless network 9 is adapted for communication with a UE 30 via a first NodeB 15 (access node) over a first wireless link 18, and also a second wireless network is adapted for communication with the UE 30 via a second NodeB 25 over a second wireless link 28. The wireless links 18, 28 are generally active only at different times. While only one RNC is shown for the first network 9, both networks may employ an RNC, and either or both of the RNCs may control multiple NodeBs. The term RNC is used generically to represent a network element further removed from the UE 30 than the NodeB, a controller of access nodes, and in various networks may be referred to by other terms such as a gateway or a mobility management entity, for example. The NodeB's may be E-NodeB's (evolved NodeBs) as contemplated under E-UTRAN. The network 9 includes an RNC 10 that controls the first NodeB 15 through a first Iub interface 12. The Iub interface 12 may be wired or wireless, and relay nodes may also be present between either of the NodeBs and the UE, such as where either network is a mesh network with fixed and/or mobile relay nodes (not shown). The RNC 10 is coupled to a core network CN (not shown, such as a mobile switching center MSC or a Serving GPRS Support Node SGSN) through an Iu interface as known in the art. If there are RNCs in each network, they may be coupled to one another through an Iur interface. Other types of networks may term these interfaces differently.

The RNC 10 includes a data processor (DP) 10A, a memory (MEM) 10B that stores a program (PROG) 10C, and a modem 10D for modulating and demodulating messages sent and received over the various bidirectional interfaces. Similarly, each of the NodeBs 15 & 25 include a DP 15A & 25A and a MEM 15B & 25B that stores a PROG 15C & 25C. The NodeB's 15 & 25 each also include a modem for communicating with their respective RNC 10 over the Iub 12, but in FIG. 1 is shown only a suitable radiofrequency RF transceiver 15D & 25D for wireless bidirectional communication at a suitable RF, such as with the UE 30 over the links 18 & 28. The UE 30 also includes a DP 30A, a MEM 30B for storing a PROG 30C, and a wireless transceiver 30D. At least the PROGs 10C & 20C, and in some embodiments also 15C, 25C and/or 30C, are assumed to include program instructions that, when executed by the associated DP, enable the electronic device to operate in accordance with the exemplary embodiments of this invention, as will be discussed below in greater detail.

Certain of the exemplary embodiments of this invention may be implemented at least in part by computer software executable by the DP 10A of the RNC 10 and by the DP 30A of the UE 30, or by hardware, or by a combination of software and hardware.

The various embodiments of the UE 30 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 15B, 25B and 30B may be of any type suitable to the local technical environment and may be implemented using any suitable data storage technology, such as semiconductor-based memory devices, magnetic memory devices and systems, optical memory devices and systems, fixed memory and removable memory. The DPs 10A, 15A, 25A and 30A may be of any type suitable to the local technical environment, and may include one or more of general purpose computers, special purpose computers, microprocessors, digital signal processors (DSPs) and processors based on a multi-core processor architecture, as non-limiting examples.

Now are described the particular embodiments of the invention, which is divided into three main aspects. The generic term node or access node will be used to describe the network element such as the NodeB 15, 25 (eNB) that either allows or restricts access to the particular UE 30 in question.

Figure 2:
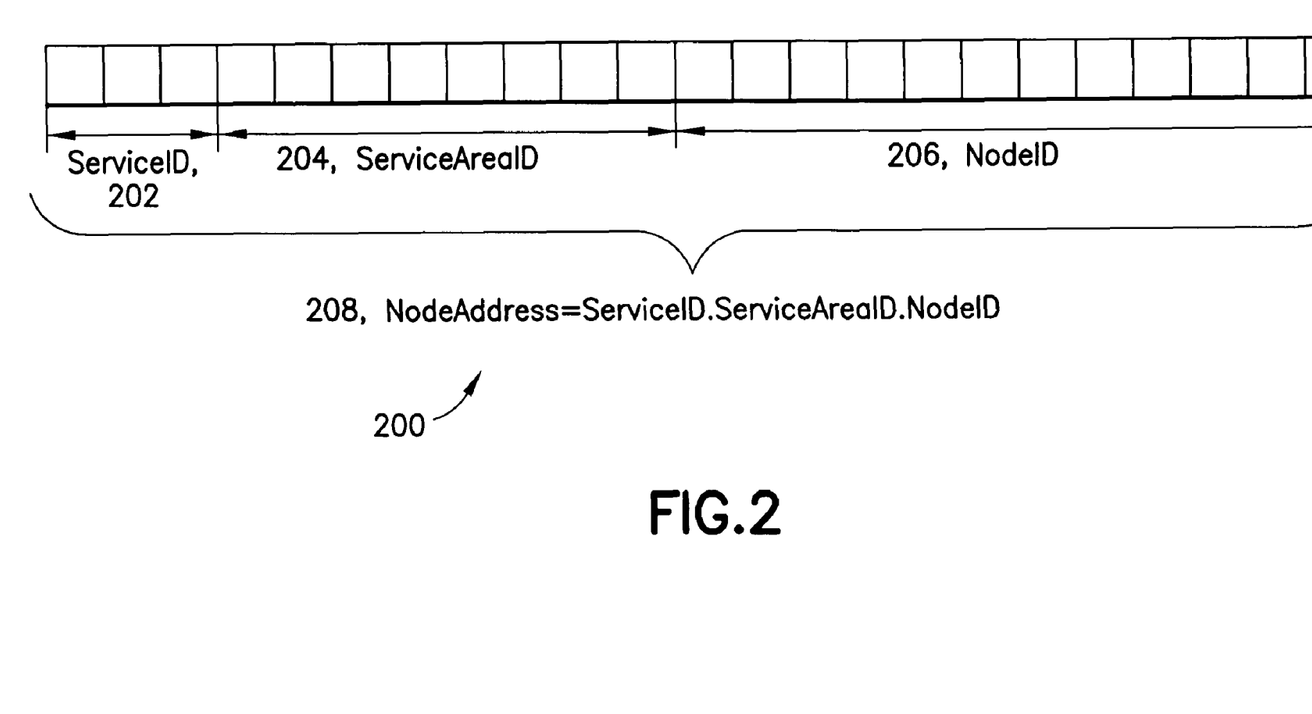
FIG. 2 is a view of different components of a node address as detailed below according to a particular embodiment of the invention.
Figure 3:
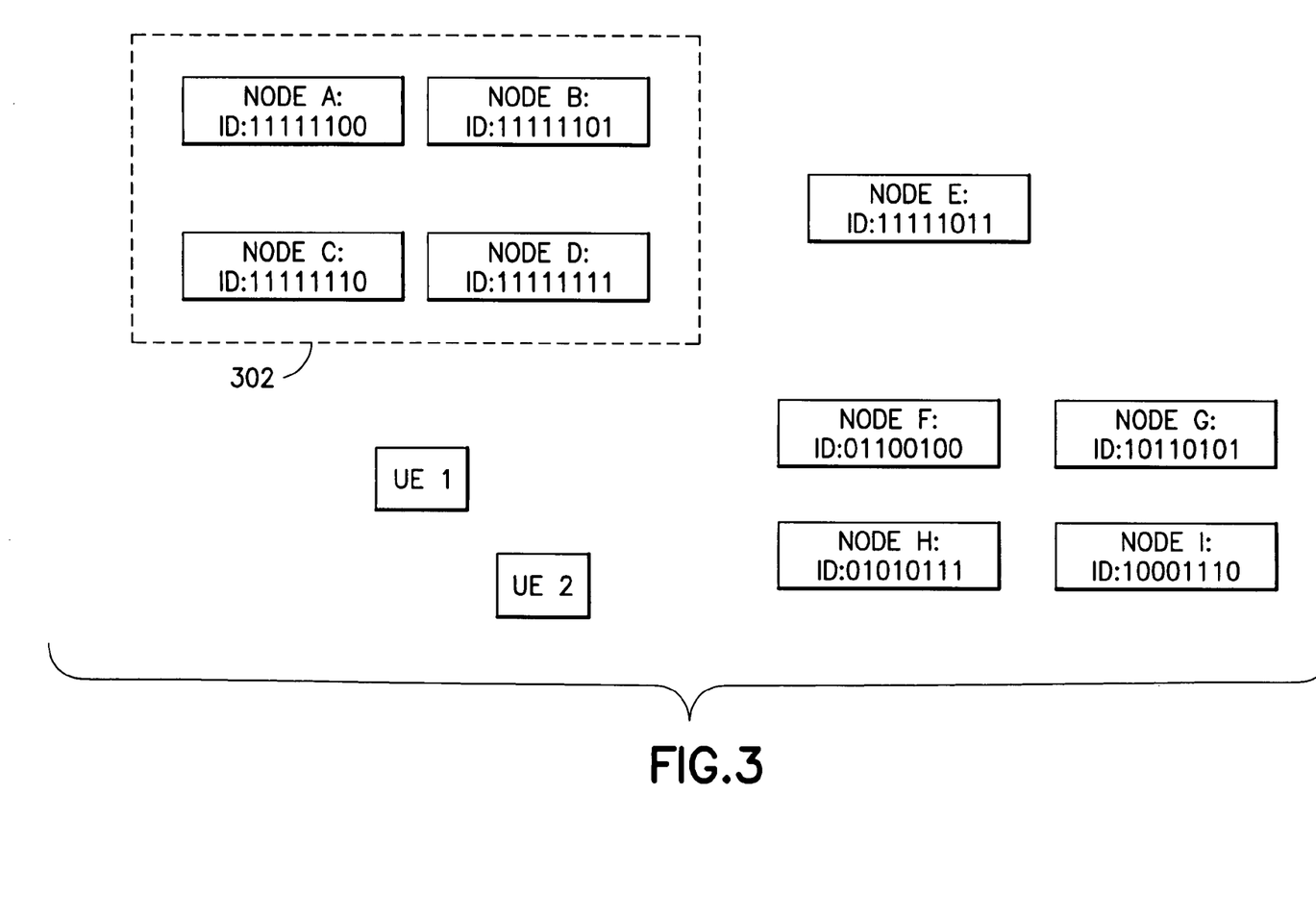
FIG. 3 is a diagram showing two UEs in the environment of various cells, illustrating how the cell address of FIG. 2 is used by different UEs to determine whether a particular cell is allowed or restricted.

First, the concept of LA/TA of the prior art is extended in length. Consider FIG. 2, which illustrates one embodiment of this extended LA/TA identifier 200. A first section 202 or bit field represents the service identifier which indicates type of service provided by the node or group of nodes within the service area/LA/TA. A second section 204 or bit field indicates a service area identifier, similar in concept to the prior art LA/TA that identifies a specific geographic area of grouped nodes and distinguishes them other groups of nodes. These first and second sections 202, 204 are similar to those used in the prior art and may be considered a legacy node ID. A third section 206 or bit stream is a node identifier, and represents an extension to the LA/TA of the prior art because it identifies a particular node within the service area identified by the second segment 204. Together, the three bit fields of FIG. 3 are termed a node address 208. The order of these bit fields may be changed in various implementations without departing from these teachings so long as the UE 30 and NodeB's 15, 25 use a pre-arranged order of those bit fields. The first section 202 is not used to identify the area or node, and is not detailed further herein. The examples below assume that the service ID indicates compatibility of service type with the UE 30, and the UE 30 uses the service area ID 204 and/or the node ID 206 to distinguish to the UE 30 the allowed versus restricted nodes.

In accordance with this first aspect, the network indicates to the UE 30, such as in broadcast system information, whether the UE 30 is to use only the (first 202 and) second section 204 for checking whether access is allowed or restricted (access validation), or whether the UE 30 shall include the third section 206 for access validation. If it is indicated that the third section 206 shall be used for access validity control, the UE 30 combines the second section 204 that identifies the service area with the third section 206 that identifies the particular node, and uses the resulting ID for an access admission check. That access admission check may be done according to the second major aspect detailed below.

In order to minimize the signalling and UE memory consumption due to too many restricted/forbidden cells tracked by prior art approaches, the network can indicate (though the NodeB 15) to the UE either or both of restricted and allowed nodes or groups of nodes. For example, the network could indicate a range or group of service areas (designated by the service area ID 204) which are forbidden service areas for the UE 30. For brevity this is referred to hereafter as a forbidden operating list or FOL. In this way the UE 30 does not need to remember/store every individual node address 208 that is either restricted or allowed. This is detailed further below. Also, the network may also choose to indicate one or multiple service area IDs 204 which are allowed to be accessed by the UE 30 (e.g. service area IDs indicating private network/Home base station). Teachings herein related to the allowed/restricted access lists (service areas) that the UE stores locally and that are signalled by the network or built by the UE incrementally may be used with the above different length ID aspect, or may be implemented independently of that first aspect of the invention.

In accordance with the third major aspect, the values of the service area IDs 204 given by the network as forbidden (those on the FOL) are retained by the UE 30 for an extended period of time, greater than 24 hours and preferably either a) until the network indicates a particular service area ID 204 is allowed and therefore no longer forbidden (or vice versa), or b) until such time as the UE's memory allocated for storing forbidden (or allowed) IDs becomes full and a new forbidden (or allowed) ID is signaled by the network. In the latter case b), preferably the oldest forbidden (or allowed) ID is dropped from the local memory of the UE 30 (first-in last-out type register) to make room for the newly signaled one. Both options a) and b) may be employed by a particular UE 30, where a particular service area ID is dropped from the restricted (or allowed) list only upon the earlier of either event.

There are several ways of applying the above aspects, of which some examples are given below. In general, the use of the third section 206 of FIG. 2 allows the concept of LA/TA to be extended to service areas as small as one node, greatly increasing its flexibility. In areas where there is no need for such resolution, the network can signal the UE 30 to use only the second section 204 of the node address 208 to distinguish whether a node in that service area is allowed or restricted.

In one implementation, the network indicates in a cell's broadcast system information whether UEs shall use only the second segment 204 of the node address 208 (e.g., the legacy LA/TA identity length) for access admission control suitability check, or whether the UEs shall (additionally) use the third segment 206 for the suitability check. If the indication from the network does not indicate use of the third section 206, then the UE 30 uses the second section 204 (e.g., the normal/existing) for its validity check procedure (the specific check procedure in use may be defined in legacy system protocol). If the indication from the network does indicate the use of the third section 206, then the UE combines the second section 204 with the third section 206 of the node that it is checking for access/restriction, and uses the combined result for its suitability check. In this manner the network adaptively sets the length of the identifier that the UEs 30 need to check for their determination of access/restriction for a particular node or group of nodes. If the service ID is considered analogous to the legacy LA/TA ID, then the third section represents an extension to that legacy ID and a longer bit field (second and third sections combined in those instances where the network signals both sections are to be used) for the UE to check for allowance/restriction. Network signaling as to whether long or short IDs are to be used for access verification may be explicit, or inherent as in the use of one length ID over the other when use of either length ID is possible, or inherent such as when protocol between the nodeB and the UE dictate that the absence of broadcasting the longer ID shall be an indication that the access validation will use the shorter ID length.

In practice this can be implemented using a very limited amount of new information. In order to enable this, the following information should be available to the UE 30 and distributed/signaled by the network 9:

An indication whether the UE shall use normal (second section) or extended (second and third section) length ID for its suitability check of a node.

Actual identity extension (third section) in the ID.

Possibly length of the part of the extension that is used (see below).

As for the identity extension/third section, in an embodiment this is defined as the same as the cell identity. Cell identity use is under discussion in LTE and is used in legacy systems as well. In LTE it is also under discussion to use a measurement identity (or a short version of it—e.g. a random number) for layer 3 identification in order to eliminate the possibility of UE's being able to 'hear' two cells with the same layer 1 (lower than the MAC layer) identity. This cell or measurement identity could in LTE be included either in the Primary BCH (P-BCH) or in the Secondary BCH (S-BCH). If placed in S-BCH this should preferably be done so that UE 30 can locate the S-BCH instance with very limited prior knowledge. However defined, the third section 206 of the node address 208 uniquely identifies the node of the service area identified by the second section 204 form all other nodes within that same service area.

Now consider a practical example. Consider a network/wireless environment which consists of:

Public part (access for all users)

Private company parts (access restricted e.g. to employers of the company)

Private eNB's—Home-eNB's (with access only to e.g. users of the household)

The network can locate all nodes within the same service area (e.g., geographic area, or frequency layer, or PLMN). This makes it simple in the sense that the operator may place an LTE network in its own service area as compared to, e.g., the operators of legacy systems like GSM and/or UTRAN. Nodes belonging to different parts of the network (e.g. as listed above) will be grouped and given node identities accordingly. Assuming that the node identity is 8 bits long, the nodes could be grouped as an example as:

Public cells (public part): Node ID=don't care/random

Private company 1: Node ID=111111xx

Private eNB: Node ID=11111011

A node would indicate whether to use the extended ID (second and third extension together) for performing its suitability check or the non-extended ID (second section). Using the example shown in FIG. 3, two UEs, UE1 and UE2 are in the environment of multiple nodes, designated A through I. Consider for this example that the IDs for those nodes, shown in FIG. 3, represent the service IDs, the second portion 204. The network signals to use only the second portion for the UE's allow/restrict decision (or alternatively do not signal whether to use legacy or extended length, and the default is to use the legacy length only). UE1 is a member of the company network 302, and UE2 is not. The FOL for UE1 indicates that service ID=111111xx is allowed (or UE1 overrides a restriction for that service area since it knows it's a member of that company network 302), so it sees the legacy-length service area ID of each and every node within the company network 302 as being allowed, without having to check the last two digits of those 8-bit service area IDs for nodes A through D. UE2 is not a member of the company network, so its FOL indicates that service area ID=111111xx is restricted. UE2 sees the legacy-length service area ID of each of nodes A through D as being restricted, since each bears a service area ID-111111xx. UE2 need not check the last two digits of those 8-bit service area IDs for nodes A through D; it already knows that entire service area is restricted.

As to the private node E with ID=1111011, it may be allowed or restricted for either or both of the UEs based on a full comparison to the actual ID number broadcast against its locally stored list. Node E is not automatically restricted to UE2 because the first six digits of the ID field do not match the restricted ID=111111xx as do those of the company network 302. Note that the ID shown for Node E may represent also the service area ID 204 and not the node ID 206, since a service area can have only one node. The remaining nodes F through I are discussed below.

When a UE 30 enters or reads cell system information it will become aware of whether the UE 30 shall use the non-extended or extended ID for its suitability check. Based on this the UE 30 will check the non-extended or extended ID against the possible stored lists in the memory 30B of the UE 30. The lists referred to here would be lists including information concerning e.g. forbidden location areas for roaming (ref. 3GPP TR 24.008) or the new lists proposed in this disclosure. Handling and comparing of the extended IDs against the locally stored lists is detailed below.

Now are shown several alternative examples for implementing forbidden or allowed ID lists using these teachings. It should be recognized that these are merely examples and not limiting to the broader aspects of the invention.

Range Indication: The network can indicate an ID length (of the extended ID or legacy-length ID) that is less than the full length of the relevant segments 204, 206 for UEs 30 to use in determining whether a node is allowed or restricted. The length to use in each cell may be broadcast together with the service area ID 204. The broadcast will include the service area ID 204 and potentially the node ID 206 (for the case where the extended length ID is used). In this manner, the range indication enables the UE 30 to compare only those bits indicated by the range indication to its locally stored restricted or allowed list(s) to find whether the particular service area or node are restricted or allowed.

Consider this a flexible length ID, where some or all bits of either or both sections 204, 206 are used by the UE 30, where the network broadcasts the specific length to use with the range indication. In one example, the network indicates in the forbidden list that portion (those bits of the entire field) of the service area ID 204 that indicate forbidden service areas. The size of that portion is variable and can be adjusted as needed by the network to distinguish over other nearby service areas, and the size of the portion can be indicated in the same message as the network used to send the FOL. Consider an example with reference again to FIG. 3. The network signals UE1 of the allowed service areas by sending the FOL, which indicates: relevant service area ID length=4 bits; FOL=01; allowed=00. This indicates to the UE that the four-bit sequence 0100 is allowed, but the sequences 0101, 0110, and 0111 are restricted. Assuming that the convention is that these four bits represent the trailing four bits of the IDs shown in FIG. 3, then (considering only nodes E through I, since nodes A through D are area-restricted by ID=111111xx as above) only node F is allowed and nodes E and G through I are restricted. The same flexible length range indication may be used identically for the third section 206 (cell ID) of the broadcast ID also.

The network may also signal the allowed service areas within the FOL relatively to the first or last forbidden service area ID. For example, consider that the network signals (also for relevant service area ID length=4 bits): FOL=01; indication number 2. This indicates 0100+2 (0110, two binary counts higher than 0100) is allowed and 0100, 0101 and 0111 are forbidden. Referring again to FIG. 3 and employing the convention that the relevant bits represent the trailing four bits of the ID shown, then nodes E through H are restricted and node I is allowed.

Now is described a similar concept, but using the aspect of extended or non-extended IDs. The network supports service area IDs of two lengths, e.g., 24 and 32 bits. Which to use in each cell is either given by the network or deducted by the UE itself. The legacy standard length for TA/SA is 24, and if the UE 30 reads a service area ID of 32 bits, the UE 30 will have to check the extra (e.g. the trailing, as in FIG. 2) 8 bits against its forbidden or allowed ID list. Assuming that an allowed ID list is used (though a forbidden/restricted list may alternatively be used), the UE 30 will check if the 8 extended bits representing the node ID 204 match the corresponding 8 bits of any node whose node address is in the allowed list. If yes, then the UE 30 can use the node (assuming the service area ID section also matches or is allowed). Otherwise the UE 30 may not use the node. So the UE 30 will know without LAU/TAU that it cannot enter the cell of that node. By using an allowed list it is possible to support many Home-eNB without an extensive forbidden list. If the UE 30 does not have a list, in one embodiment it is defined as a default condition that the UE 30 may not access any nodes using the longer node address (service area ID plus node ID).

Consider again FIG. 3. Assume that all nodes bear the same service area ID 204 in their node address 208, so the first 24 bits are identical. All of these nodes have some restrictions as to which UE is allowed, so all of them broadcast their extended ID, 32 bits. The 8 bits shown in the IDs of FIG. 3 represent the cell IDs in this example, the trailing 8 bits of the extended ID. The FOL for UE1 indicates that node ID=111111xx is allowed, so UE1 knows that it can gain access to any of nodes A through D. The FOL for UE2 indicates that node ID=111111xx is restricted, so UE2 knows after checking these first six digits of those nodes' broadcast ID that they are each restricted for UE2. Node E is a private network, so both UE1 and UE2 need to check the entire 32 bit ID against their stored list to see whether they are restricted or allowed for node E. For nodes F through I, the network may send range indication messages as detailed above, or the UEs may need to check the entire 32 bit ID against their stored list of allowed/restricted IDs to determine whether they are allowed or restricted access.

The network can indicate two service area IDs, and all service area IDs between those two are forbidden. Allowed service areas within the FOL may be signalled relatively to the first and/or last forbidden service area ID (e.g. indication number 5 indicates signaled service area ID+5 is allowed).

It will be understood that while the examples reference using only the service area ID segment of the node address, the combined second and third sections (service area ID and node ID) may also be used in a similar manner for the network to indicate allowed or restricted IDs in the FOL.

Delivery of the forbidden or allowed lists from the network could be done during registration of the UE 30, or via update signalling between the network and the UE. The lifetime of such list could be seen as extended as detailed above with respect to the third aspect, as compared to what is possible in the current standard (maximum 24 hours). The lifetime of the lists could also span radio access technology RAT changes.

As is seen from the above, this invention provides a way to handle multiple private/home networks and nodes without expanding the list of forbidden or allowed nodes that are stored locally in the UE beyond a reasonable number. Memory usage in the UE for this purpose is therefore limited, and signaling required to implement embodiments of this invention are seen to be limited as compared to extending the prior art to cover more forbidden/allowed nodes.

As can be seen from the above, this invention provides a subscription based idle-mode mobility (SBM) procedure that distributes the subscribers/UEs according to their preferred and allowed sub-networks, without excessive signaling or UE battery consumption. It speeds up the idle-mode mobility procedures by performing them inside the radio network in a distributed manner. At the same time, the excess traffic between the UE 30, radio network 9 and core network is reduced. In addition to coverage, the node selection is based on subscription by the UE. This invention enables a UE using a 3.9G network to have WLAN-like mobility (no need for neighbor lists) but with reduced power consumption on searching for valid nodes for cell selection.

Figure 4:
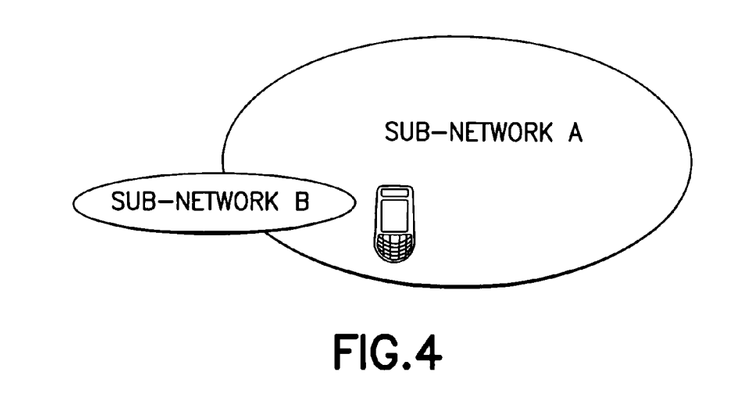
FIG. 4 is an illustration of one UE in relation to two different sub networks, as an overview for FIGS. 5-7.
Figure 5:
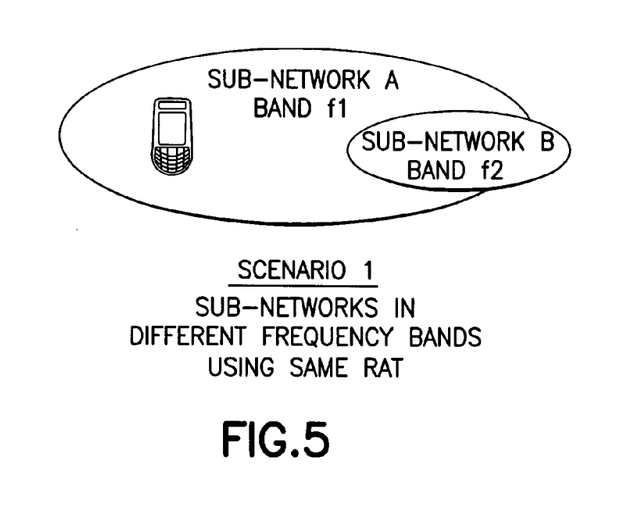
FIGS. 5-7 illustrate three different exemplary scenarios where the UE moves between different sub-networks.
Figure 6:
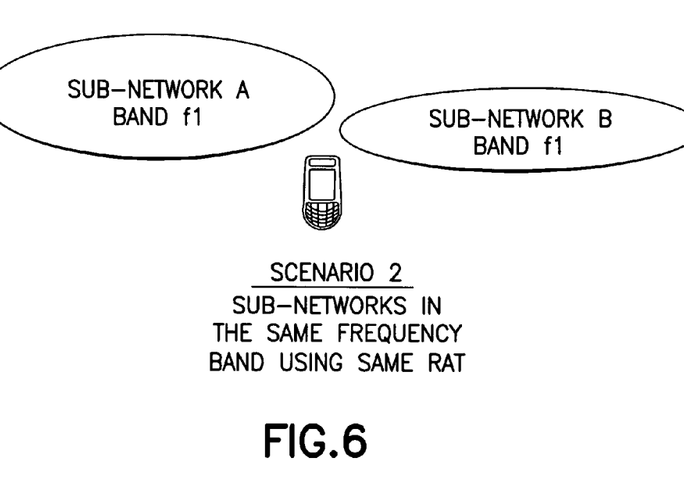
Figure 7:
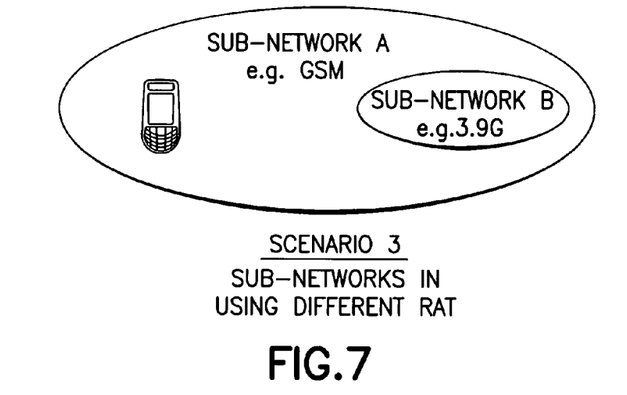

FIGS. 5-7 illustrate three distinct cases of FIG. 4 where the UE 30 moves from one sub-network to another to which it may or may not be allowed access (one sub-network may be restricted according to the ID regimen detailed above). These figures and description detail mobility of the UE between those sub-networks, and also consider where one sub-network may be a higher priority to the UE than the other. These Figures and description show how signaling and battery consumption may be saved by using the ID regimen detailed above for determining which nodes/service areas/sub-networks are allowed or restricted to the UE 30.

In FIG. 5 a UE has access to sub-networks A and B; in FIG. 6 a UE has access to sub-network A but not sub-network B; and in FIG. 7 a UE has access to sub-network B but not sub-network A. These sub networks may be distinguished from one another by different service area IDs. In all cases the UE's mobility works consistently when the UE approaches or leaves the sub-network dominance and/or coverage area. The sub-networks could be belonging to same or different radio access technology (RAT). In the case of the same technology they could be deployed on overlapping or separate frequency bands. In the case of overlapping frequency there should be clear dominance areas. The UE should be aware of its preferred or allowed sub-networks for being able to camp on the preferred sub-networks without creating excess signaling traffic or battery consumption. In one embodiment, the neighbor cell information on adjacent cells is additionally used, at least between sub-networks, as the different sub-networks could be partially uncoordinated.

As seen in FIG. 5, coverage areas for the sub-networks are fully overlapping. In a first case, the UE has access to sub-networks A and B, and is entering the coverage area of B. With neighbor sub-network B information included in the sub-network A broadcast channel (as in current 3G), subscription based preferences/priorities would enhance the UE's optimal selection of cells in sub-network B. Without that neighbor sub-network information, the UE could still search for nodes in sub-network B (e.g. periodically) if sub-network B can be a higher priority. If sub-network A is already the highest priority, the UE wouldn't need to search another sub-network.

Further in a second case of FIG. 5, the UE has access to sub-network A but not to sub-network B, and is entering the coverage area of B. In the event that neighbor cell information for nodes in sub-network B is obtained from other sub-networks (some UEs may have access to both networks) the UE could notice that sub-network B is not an allowed sub-network using the above ID protocol. This would reduce signaling and battery consumption. In the event that the UE does not have any neighbor information for nodes in sub-network B, if the UE at the same time loses coverage of sub-network A then it could still find sub-network B, read the System Information and abandon attempts to establish itself on sub-network B since this is not allowed.

As seen in FIG. 6, coverage areas for the sub-networks use the same frequency/access technology, but there is clear dominance as between them due to geographic separation. In a first case, the UE has access to both sub-networks A and B, and is leaving the dominance area of A and entering the dominance area of B. With neighbor sub-network B information included in sub-network A's broadcast channel, the UE readily moves to sub-network B. If there is no neighbor sub-network information concerning sub-network B received from sub-network A, it is still possible that the UE would find sub-network B because of quality reasons (interference, coverage) inherent in their clear dominance areas. If sub-network B has a higher priority than sub-network A based on the UE subscription, the UE could try select sub-network B even if the coverage of sub-network A is still adequate.

In a second case of FIG. 6 the UE has access to sub-network A but not to sub-network B and the UE is leaving the coverage area of sub-network. With neighbor information on other sub-networks included (some UEs may have access to both networks), the UE would notice that sub-network B is not an allowed sub-network, and reduce signalling and battery consumption by not attempting to establish itself on sub-network B. Without neighbor sub-network information, if the UE loses coverage of sub-network A it could still find sub-network B but would abandon efforts to establish itself there since it is not allowed.

As seen in FIG. 7, the sub-networks overlap in coverage but use different radio access technologies. In a first case, the UE has access and capability to sub-networks A and B, and is entering the coverage area of sub-network B. With neighbor sub-network B information included in sub-network A's broadcast channel, mobility for the UE works as normal, but subscription based priorities would enhance optimal selection. Without neighbor sub-network information, the UE could still search sub-network B if sub-network B is higher priority. If sub-network A is highest priority, the UE wouldn't need to search another sub-network on the other technology.

In a second case of FIG. 6 the UE has access to sub-network A but not to sub-network B (e.g. missing UE capability), and is entering the coverage area of sub-network B. With neighbor information on other sub-networks included (some UEs may have access to both networks), the UE could notice that B is not an allowed sub-network using the ID protocol set forth above. This would reduce signaling and battery consumption as compared to attempting access to a sub-network to which it is not allowed. Without neighbor information, if the UE at the same time loses coverage of sub-network A, then it could still find sub-network B, read the System Information, and abandon any efforts to establish itself on sub-network B since this is not allowed.

Figure 8:
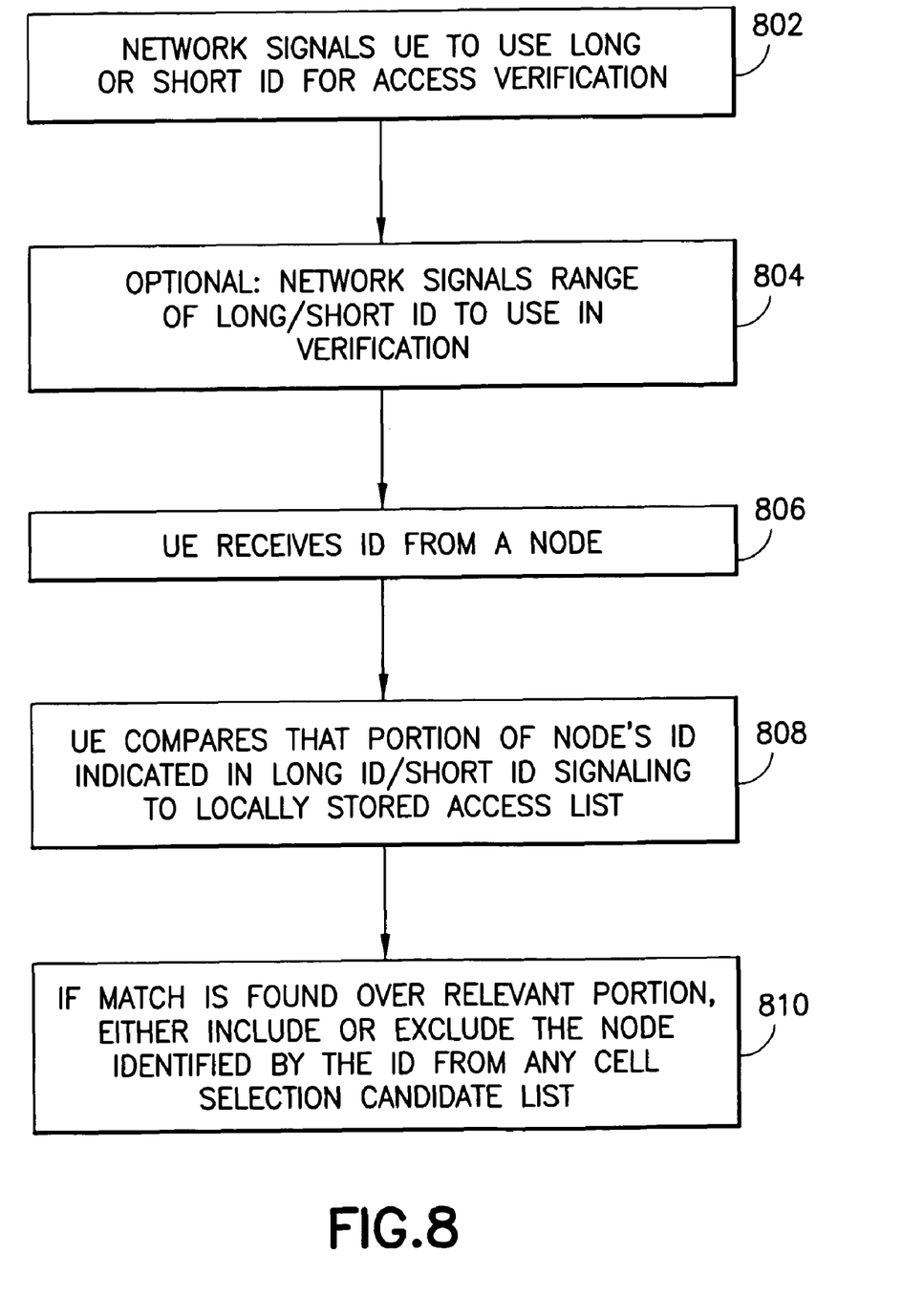
FIG. 8 is a flow diagram of process steps used in an embodiment of the invention.

As is evident from the above, embodiments of this invention provide a method, apparatus, and computer program product embodied in a memory and executable by a processor for signaling to a user equipment with an indication whether to use a short or long identifier for UE access verification. In an embodiment, the lack of an explicit signal here may indicate by default that the shorter ID is to be used, or the use of either the short or long ID by the node acts as the explicit signal, where the node is configured to signal with either length ID. This is seen at step 802 of FIG. 8. Optionally at step 804, the network may also signal a range of bits within the short or long ID for the UE to use for verification. The UE receives an ID from a node at step 806 (which may be in the same broadcast message as the information sent in block 802), and checks at step 808 that relevant portion of the node identifier (relevant portion indicated in the message of block 802 as may be further restricted by block 804) against its locally stored list of allowed or restricted identifiers, generically termed an access list in FIG. 8. It is understood that the access list can list restricted IDs or allowed IDs. If a match is found by that comparing, then at block 810 the UE considers the node associated with the broadcast identifier as either restricted or allowed for the UE, as the case may be for the specific type of access list used for comparing. For restricted nodes, the UE excludes that node from any list of candidate nodes for cell selection. For allowed nodes, the UE includes that node in its list of candidate nodes for cell selection (e.g., handover).

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   determining by an apparatus whether access verification is to be done using an identifier of a first length or is to be done using an identifier of a second length;
   examining a node address by the apparatus;
   performing by the apparatus access verification by comparing a field of the received node address against a locally stored access list, wherein the field compared against the locally stored access list is of either the first or the second length, depending on whether a determination was made to do access verification using an identifier of the first length or a determination was made to do access verification using an identifier of the second length; and
   adding by the apparatus at least the compared field of the node address to a locally stored list of cell selection candidate nodes for the case where the access list comprises a list of allowed identifiers, or excluding the compared field of the node address from the locally stored list of cell selection candidate nodes for the case where the access list comprises a list of restricted identifiers.

2. The method of claim 1, further comprising signaling to support a handover to a node having an address whose field matches an entry on the locally stored list of cell selection candidate nodes.

3. The method of claim 1, wherein determining whether access verification is to be done using an identifier of the first length or is to be done using an identifier of the second length is determined implicitly from the length of the received node address.

4. The method of claim 1, wherein determining whether access verification is to be done using an identifier of the first length or is to be done using an identifier of the second length is accomplished based at least in part on explicit signaling received from a network separate from the node address and received over a broadcast channel.

5. The method of claim 4, wherein the explicit signaling comprises a range indication that indicates how many bits are to be compared.

6. The method of claim 1, wherein the node address comprises a second section that is of the first length, and a third section, wherein the combination of the second section with the third section is of the second length.

7. The method of claim 6, wherein the second section comprises a service area identifier that identifies a geographic grouping of nodes and the third section comprises a node identifier that uniquely identifies one node of the grouping of nodes.

8. The method of claim 7, wherein the node address further comprises a first section that indicates a type of service, and the method further comprises using the first section to additionally distinguish whether the node address is allowed or restricted prior to performing the access verification.

9. The method of claim 1, further comprising, for the case where the access list comprises a list of restricted identifiers:
   locally storing service area identifiers that are restricted on a forbidden list;

when the service area is no longer forbidden, removing all of the service area identifiers from the forbidden list;

when a memory allocated for storing the forbidden list becomes full, removing the oldest stored service area identifier from the forbidden list whenever a new stored service identifier is added to the forbidden list.

10. The method of claim 1, wherein the apparatus comprises a mobile terminal moving between a node operating with one radio access technology and another node operating with a different radio access technology.

11. An apparatus comprising:

a receiver configured to receive a node address;

a processor configured to determine whether access verification is to be done using an identifier of a first length or is to be done using an identifier of a second length, and further configured to perform access verification by comparing a field of the received node address against a locally stored access list, wherein the field compared against the locally stored access list is of either the first or the second length, depending on whether a determination was made to do access verification using an identifier of the first length or a determination was made to do access verification using an identifier of the second length; and a local memory to which the processor adds at least the compared field of the node address to a list of cell selection candidate nodes for the case where the access list comprises a list of allowed identifiers, or from which the processor excludes the compared field of the node address from the list of cell selection candidate nodes for the case where the access list comprises a list of restricted identifiers.

12. The apparatus of claim 11, wherein the apparatus further comprises a receiver configured to receive the node address, and wherein the processor and receiver are further configured to signal to support a handover of the apparatus to a node having an address whose field matches an entry on the locally stored list of candidate cells.

13. The apparatus of claim 11, wherein the processor determines whether access verification is to be done using an identifier of the first length or is to be done using an identifier of the second length based at least in part on the length of the node address that is received at the receiver.

14. The apparatus of claim 11, wherein the processor determines whether access verification is to be done using an identifier of the first length or is to be done using an identifier of the second length from explicit signaling received from a network at the receiver separate from the received node address and received on a broadcast channel.

15. The apparatus of claim 14, wherein the explicit signaling comprises a range indication that signifies how many bits are to be compared.

16. The apparatus of claim 11, wherein the node address comprises a second section that is the of first length, and a third section, wherein the combination of the second section with the third section is of the second length.

17. The apparatus of claim 16, wherein the second section comprises a service area identifier that identifies a grouping of nodes and the third section comprises a node identifier that uniquely identifies one node of the grouping of nodes.

18. The apparatus of claim 17, wherein the node address further comprises a first section that indicates a type of service, and the method further comprises using the first section to additionally distinguish whether the node address is allowed or restricted prior to performing the access verification.

19. The apparatus of claim 11, wherein, for the case where the access list comprises a list of restricted identifiers the service area identifiers that are restricted are stored on a forbidden list of the memory:

when the service area is no longer forbidden, the service area identifiers are removed from the forbidden list of the memory;

when an allocation of the memory for storing the forbidden list full, the oldest stored service area identifier is removed from the forbidden list whenever a new stored service area identifier is added to the forbidden list.

20. The apparatus of claim 11, wherein the apparatus comprises a mobile terminal moving between a node operating with one radio access technology and another node operating with a different radio access technology.

21. A non-transitory computer readable memory embodying a program of machine-readable instructions, execution of which by a digital data processor causes the performance of actions comprising:

determining whether access verification is to be done using an identifier of a first length or is to be done using an identifier of a second length;

receiving a node address;

performing the access verification by comparing a field of the received node address against a locally stored access list, wherein the field compared against the locally stored access list is of either the first or the second length, depending on whether a determination was made to do access verification using an identifier of the first length or a determination was made to do access verification using an identifier of the second length; and adding at least the compared field of the node address to a locally stored list of cell selection candidate nodes for the case where the access list comprises a list of allowed identifiers, or excluding the compared field of the node address from the locally stored list of cell selection candidate nodes for the case where the access list comprises a list of restricted identifiers.

22. An apparatus comprising:

receiving means for receiving a node address;

processing means for determining whether access verification is to be done using an identifier of a first length or is to be done using an identifier of a second length, and for performing access verification by comparing a field of the received node address against a locally stored access list, wherein the field compared against the locally stored access list is of either the first or the second length, depending on whether a determination was made to do access verification using an identifier of the first length or a determination was made to do access verification using an identifier of the second length; and memory means for adding at least the compared field of the node address to a list of cell selection candidate nodes for the case where the access list comprises a list of allowed identifiers, or for excluding the compared field of the node address from the list of cell selection candidate nodes for the case where the access list comprises a list of restricted identifiers.

* * * * *